United States Patent
Gottin et al.

(10) Patent No.: US 10,802,975 B2
(45) Date of Patent: Oct. 13, 2020

(54) IN-MEMORY DATAFLOW EXECUTION WITH DYNAMIC PLACEMENT OF CACHE OPERATIONS

(71) Applicant: EMC IP Holding Company LLC, Hopkinton, MA (US)

(72) Inventors: Vinícius Michel Gottin, Rio de Janeiro (BR); Fábio André Machado Porto, Petropolis (BR); Yania Molina Souto, Petropolis (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 1 day.

(21) Appl. No.: 16/040,761

(22) Filed: Jul. 20, 2018

(65) Prior Publication Data

US 2020/0026654 A1    Jan. 23, 2020

(51) Int. Cl.
*G06F 12/0871* (2016.01)
*G06F 12/0891* (2016.01)

(52) U.S. Cl.
CPC ...... *G06F 12/0871* (2013.01); *G06F 12/0891* (2013.01); *G06F 2212/1016* (2013.01); *G06F 2212/601* (2013.01)

(58) Field of Classification Search
None
See application file for complete search history.

(56) References Cited

U.S. PATENT DOCUMENTS

| 6,601,143 B1* | 7/2003 | Lamparter | G06F 12/127 711/133 |
| 2002/0194326 A1* | 12/2002 | Gold | G06F 11/008 709/224 |
| 2008/0071987 A1* | 3/2008 | Karn | G06F 12/0802 711/118 |

(Continued)

OTHER PUBLICATIONS

U.S. Appl. No. 15/662,704, filed Jul. 28, 2017 entitled: "Automatic Placement of Cache Operations for Complex In-Memory Dataflows".

(Continued)

*Primary Examiner* — William E. Baughman
(74) *Attorney, Agent, or Firm* — Ryan, Mason & Lewis, LLP

(57) ABSTRACT

A dataflow execution environment is provided with dynamic placement of cache operations. An exemplary method comprises: obtaining a first cache placement plan for a dataflow comprised of multiple operations; executing operations of the dataflow and updating a number of references to the executed operations to reflect remaining executions of the executed operations; determining a current cache gain by updating an estimated reduction in the total execution cost for the dataflow of the first cache placement plan; determining an alternative cache placement plan for the dataflow following the execution; and implementing the alternative cache placement plan based on a predefined threshold criteria. A cost model is optionally updated for the executed operations using an actual execution time of the executed operations. A cached dataset can be removed from memory based on the number of references to the operations that generated the cached datasets.

20 Claims, 17 Drawing Sheets

(56) References Cited

U.S. PATENT DOCUMENTS

| | | | |
|---|---|---|---|
| 2013/0138889 A1* | 5/2013 | Chockler | G06F 12/0866 |
| | | | 711/129 |
| 2013/0166724 A1* | 6/2013 | Bairavasundaram | |
| | | | G06F 9/5016 |
| | | | 709/224 |
| 2014/0006723 A1* | 1/2014 | Tammam | G06F 12/0866 |
| | | | 711/146 |
| 2015/0127905 A1* | 5/2015 | Chang | G06F 12/0871 |
| | | | 711/118 |
| 2016/0117241 A1* | 4/2016 | Shah | G06F 12/0871 |
| | | | 711/119 |
| 2017/0017575 A1* | 1/2017 | Razin | G06F 12/0888 |

OTHER PUBLICATIONS

Zaharia et al., "Resilient distributed datasets: a fault-tolerant abstraction for in-memory cluster computing," in 9th USENIX conference on Networked Systems Design and Implementation, 2012.

Gottin et al., "Automatic Caching Decision for Scientific Dataflow Execution in Apache Spark," in BeyondMR'18 Workshop SIGMOD 2018, Houston, TX, USA, 2018.

Sparks et al., "KeystoneML: Optimizing pipelines for large-scale advanced analytics," in Data Engineering (ICDE), 2017 IEEE 33rd International Conference on, 2017.

F. e. a. Porto, "Constellation Queries over Big Data," in CoRR abs/1703.0, 2017.

C. Reiss, "Understanding Memory Configurations for In-Memory Analytics," EECS Department, University of California, Berkeley, 2016.

* cited by examiner

S-CACHE PROCESS 300

*ini*   the initial state denoting no applied caches
*beam*  an argument to limit the number of candidate states generated at each iteration

S-CACHE(*ini, beam*):
*best* ← *ini*, the best state so far
*open* ← [ *ini* ], list of states to explore ordered by cache gain
*closed* ← [ ], an empty list, the explored states
while *open* is not empty:
    $S$ ← take and remove the first state in *open*
    *closed* ← append $S$ to *closed*
    if Cost($S$) < Cost(*best*):
        *best* ← $S$
    end if
    *ops* ← list of *o* in $O$ sorted by Cache-gain(*o,S*)
    *ops* ← first *beam* items of *ops*
    for *o* in *ops* such that Cache-gain(*o,S*)>0:
        $S'$ ← $S$ with *o* additionally cached
        if $S'$ not in *closed*:
            *open* ← add $S'$ to *open*,
                    sorted by lowest state cost
        end if
    end for
end while
return *best*

FIG. 3

DATAFLOW OPERATIONS TABLE 500

| | Operation | Description |
|---|---|---|
| Transformations | | |
| T1 | Quadtree | Builds a Quadtree (QT) from data in the input file. |
| T2 | Find neighbors | For each star finds its neighbors using the QT built in T1. |
| T3 | Comp. matching pairs | For each pair (star, neighbor) evaluates a matching criterion. |
| T4 | Join | Joins buckets resulting from the matching. |
| T5 | Filter | Filters out matched tuples. |
| T6 | Compute quality | For each QT leaf node checks some quality measure. |
| Actions | | |
| A1 | Count | Returns the number of leaf nodes in QT. |
| A2 | Collect | Obtains the results of FT. |
| A3 | Count | Returns the number of rows in the result. |
| A4 | Collect | Obtains the results of the quality measure. |

OPERATIONS PROPERTIES 600

| OPERATION | TYPE | PRIOR | FOLLOWING | ACCUM. COST | WRITE CACHE COST | READ CACHE COST |
|---|---|---|---|---|---|---|
| T1 | TRANSFORMATION | - | T2, A1 | 39.30 | 80 | 16 |
| T2 | TRANSFORMATION | T1 | T3 | 334.75 | 9 | 1.8 |
| T3 | TRANSFORMATION | T2 | T4 | 0.069 | 6 | 1.2 |
| T4 | TRANSFORMATION | T3 | T5 | 0.13 | 1 | 0.2 |
| T5 | TRANSFORMATION | T4 | A2, A3 | 0.10 | 0.5 | 0.1 |
| T6 | TRANSFORMATION | T1 | A4 | 2.47 | 1.5 | 0.3 |
| A1 | ACTION | T1 | - | 4 | - | - |
| A2 | ACTION | T5 | - | 2 | - | - |
| A3 | ACTION | T5 | - | 2 | - | - |
| A4 | ACTION | T6 | - | 12 | - | - |

DYNAMIC CACHE PLACEMENT DATAFLOW EXECUTION PROCESS 900 (XD-CACHE)

Inputs: a dataflow $w$, a model for the transformation costs and cache costs $m$, the infrastructure $i$ and dataset $d$;
 threshold minimum error in the cost model, for each evaluation unit, that triggers a re-application of a cache plan
Output: updated a model for the transformation costs and cache costs $m$, updated infrastructure $i$ and updated dataset $d$.

XD-CACHE ($w$, $m$, $i$, $d$, threshold):
 best_cache, best_gain ← S-CACHE($w$, $m$, $i$, $d$)
 $w$ ← apply best_cache to $w$
 while remaining evaluation units in $w$:
  //start of execution stage
  Trace ← RUN_EVALUATION_UNIT($w$, $i$, $d$)
  $m$ ← UPDATE_MODEL($m$, Trace)
  $i$ ← EVAL_INFRASTRUCTURE($i$, Trace)
  $d$ ← PROVENANCE_DATASETS($w$,$d$, Trace)
  //ending of execution stage
  if number of evaluation units in $w$ > 1:
   //starting of cache re-evaluation stage
   $w$ ← remove references of lineage executed in Trace from $w$
   for each cached operation $c$ in $w$:
    if NUMREFERENCES($c$, $w$) = 0:
     $w$ ← UNCACHE($c$,$w$)
    end if
   end for
   best_gain ← UPDATE_GAIN(best_gain,$w$, $m$)
   alternative_cache, alternative_gain ← S-CACHE($w$, $m$, $i$, $d$)
   if alternative_gain − best_gain > threshold:
    $w$ ← apply alternative_cache to $w$
    best_gain ← alternative_gain
   end if
   //ending of cache re-evaluation stage
  end if
 end while
 return $m$, $i$, $d$

FIG. 9

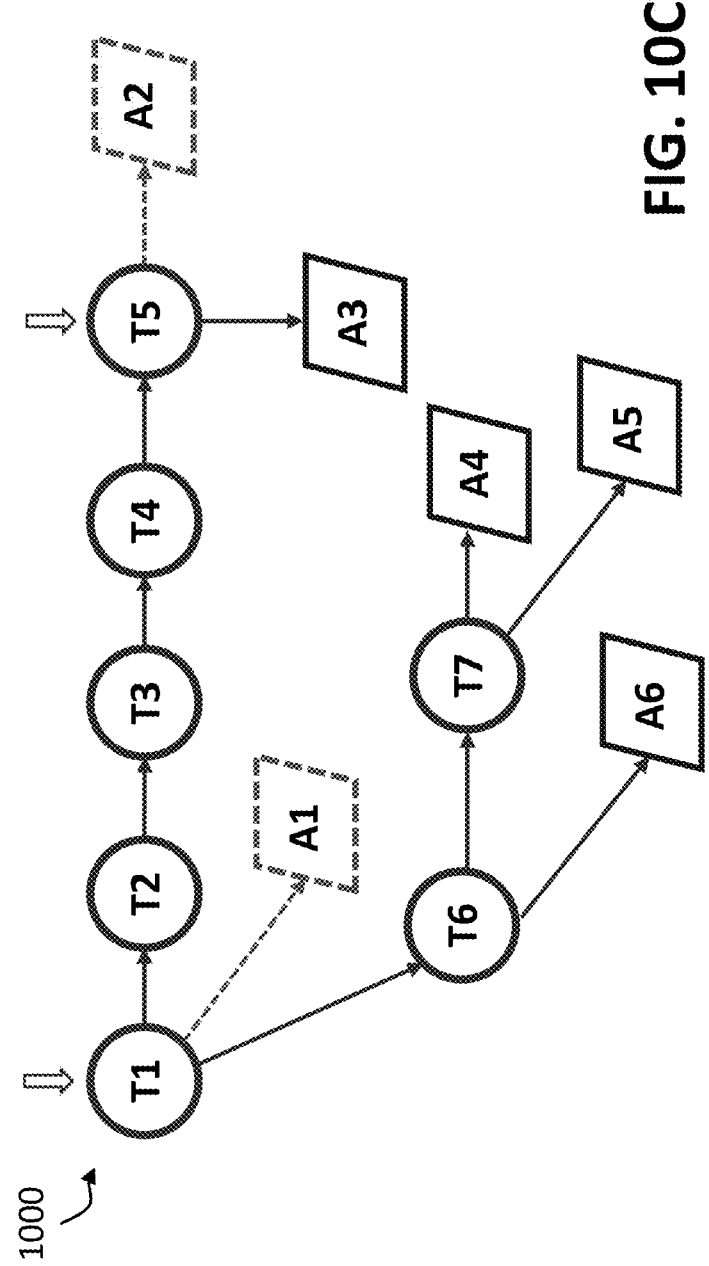

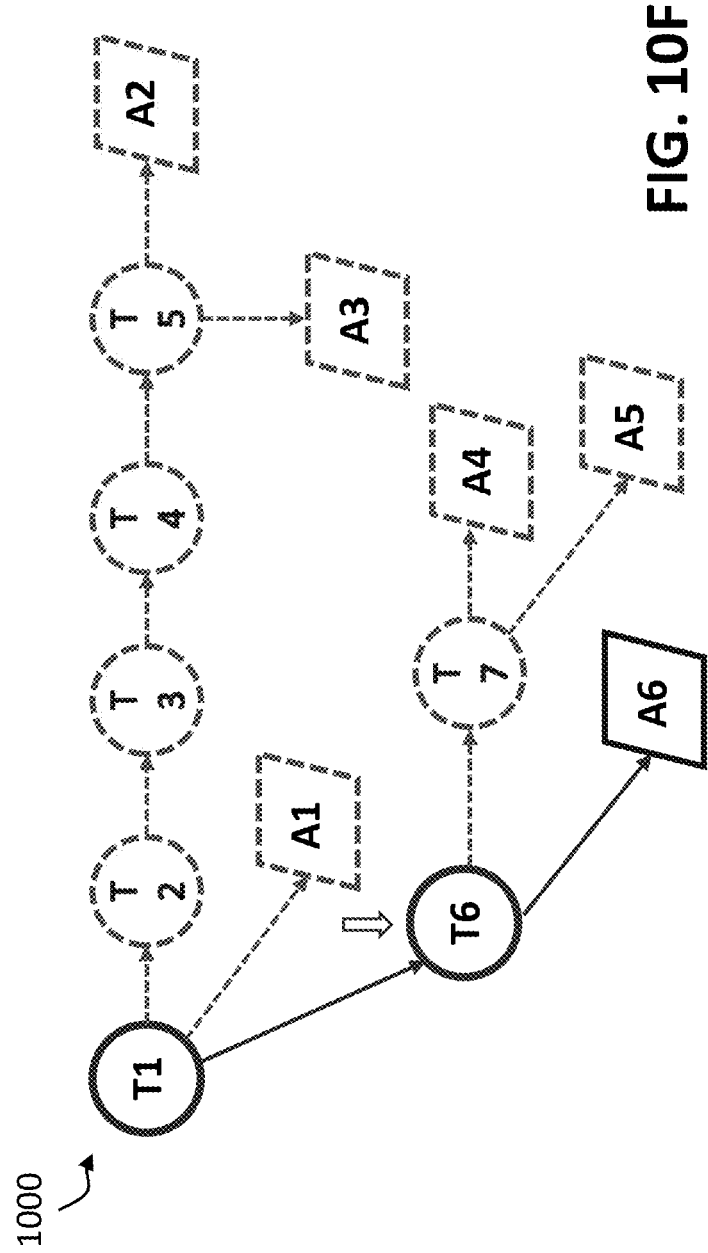

IN-MEMORY DATAFLOW EXECUTION WITH DYNAMIC PLACEMENT OF CACHE OPERATIONS

FIELD

The field relates generally to caching techniques for a dataflow execution environment.

BACKGROUND

In some dataflows, a given action can have multiple executions during the dataflow, with various dependent transformations. To improve the performance of such dataflows, some dataflow engines provide mechanisms to persist the output of a transformation using a caching operation, thereby avoiding the re-execution of precedent operations. The caching operation indicates that the dataset produced by an operation should be kept in memory for future reuse, without the need for recomputation.

The use of a caching operation potentially avoids the increased cost incurred by multiple actions in a dataflow. In the case of real-time dataflow executions, however, identifying the datasets to cache as the dataflow progresses is not trivial.

A need therefore exists for techniques for dynamic placement of cache operations during the execution of such dataflows.

SUMMARY

Illustrative embodiments of the present disclosure provide for dataflow execution with dynamic placement of cache operations. In one embodiment, an exemplary method comprises: obtaining a first cache placement plan for a dataflow comprised of a plurality of operations, wherein the first cache placement plan comprises a combination of output datasets of a subset of the operations in the dataflow to cache based on an estimated reduction in a total execution cost for the dataflow when the first cache placement plan is implemented given an input dataset; executing one or more operations of the dataflow and updating a number of references to the one or more executed operations to reflect remaining executions of the one or more executed operations in the dataflow; determining a current cache gain by updating the estimated reduction in the total execution cost for the dataflow of the first cache placement plan based on the updated number of references to the one or more executed operations; determining an alternative cache placement plan for the dataflow following the execution; and implementing the alternative cache placement plan when a difference between the current cache gain for the first cache placement plan and an estimated reduction in the total execution cost for the dataflow when the alternative cache placement plan is implemented satisfies a predefined threshold criteria.

In some embodiments, a cost model is updated for the one or more executed operations based on a difference between prior estimates of an execution time of the one or more executed operations obtained from the cost model and an actual execution time of the one or more executed operations. In at least one embodiment, one or more of the cached datasets are removed from memory based on the number of references to the operations that generated the cached datasets following the updating of the number of references.

Other illustrative embodiments include, without limitation, apparatus, systems, methods and computer program products comprising processor-readable storage media.

BRIEF DESCRIPTION OF THE DRAWINGS

FIG. 3 illustrates exemplary pseudo code for an S-CACHE process, according to an embodiment;

FIGS. 4-8, collectively, provide an example based on a Constellation Query dataflow to illustrate a context of the present disclosure;

FIG. 9 illustrates exemplary pseudo code for a dynamic cache placement dataflow execution process (also referred to as XD-CACHE), according to one embodiment of the disclosure;

FIGS. 10A through 10F illustrate various cache placement strategies over time during execution of a dataflow, according to some embodiments of the disclosure;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for dataflow execution with dynamic placement of cache operations.

In one or more embodiments, an exemplary dynamic cache placement dataflow execution process is provided that uses a cache placement algorithm, to make decisions dynamically, during execution of a dataflow. In some embodiments, the use of memory is substantially optimized by analyzing over time the data that should be removed from memory because it will not be needed anymore or if the data selected for caching remains a substantially best option as the actions are being executed. These types of decisions help improve the execution times, for example, in cases where memory is limited.

One or more aspects of the disclosure recognize that it is possible to capture real-time costs of the transformations, update the model and adjust the caching options, all while the dataflow actions are being executed. Further, revising the cost models, during an execution of the dataflow, based on actual observations enables the creation of a provenance database. Thus, for future executions of similar dataflows or operations, the cost models can rely on the updated cost models of previous applications of the disclosed cache placement techniques.

Figure 1:
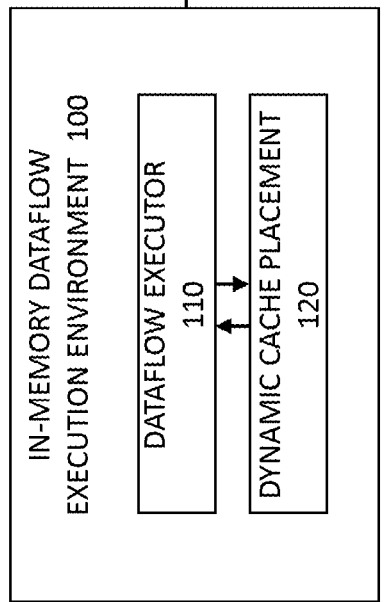
FIG. 1 illustrates an exemplary in-memory dataflow execution environment, according to one or more embodiments of the disclosure.

FIG. 1 illustrates an exemplary in-memory dataflow execution environment 100, according to one or more embodiments of the disclosure. As shown in FIG. 1, the exemplary in-memory dataflow execution environment 100 processes a given dataflow, a cost model, an infrastructure and a dataset as inputs.

The dataflow is executed by a dataflow executor 110. A dynamic cache placement module 120 monitors the execution of the dataflow by the dataflow executor 110 and dynamically updates the placement of cache operations during the dataflow execution, as discussed further below in conjunction with FIG. 9.

The exemplary in-memory dataflow execution environment 100 generates an updated cost model, an updated infrastructure and an updated dataset as outputs.

Figure 2:
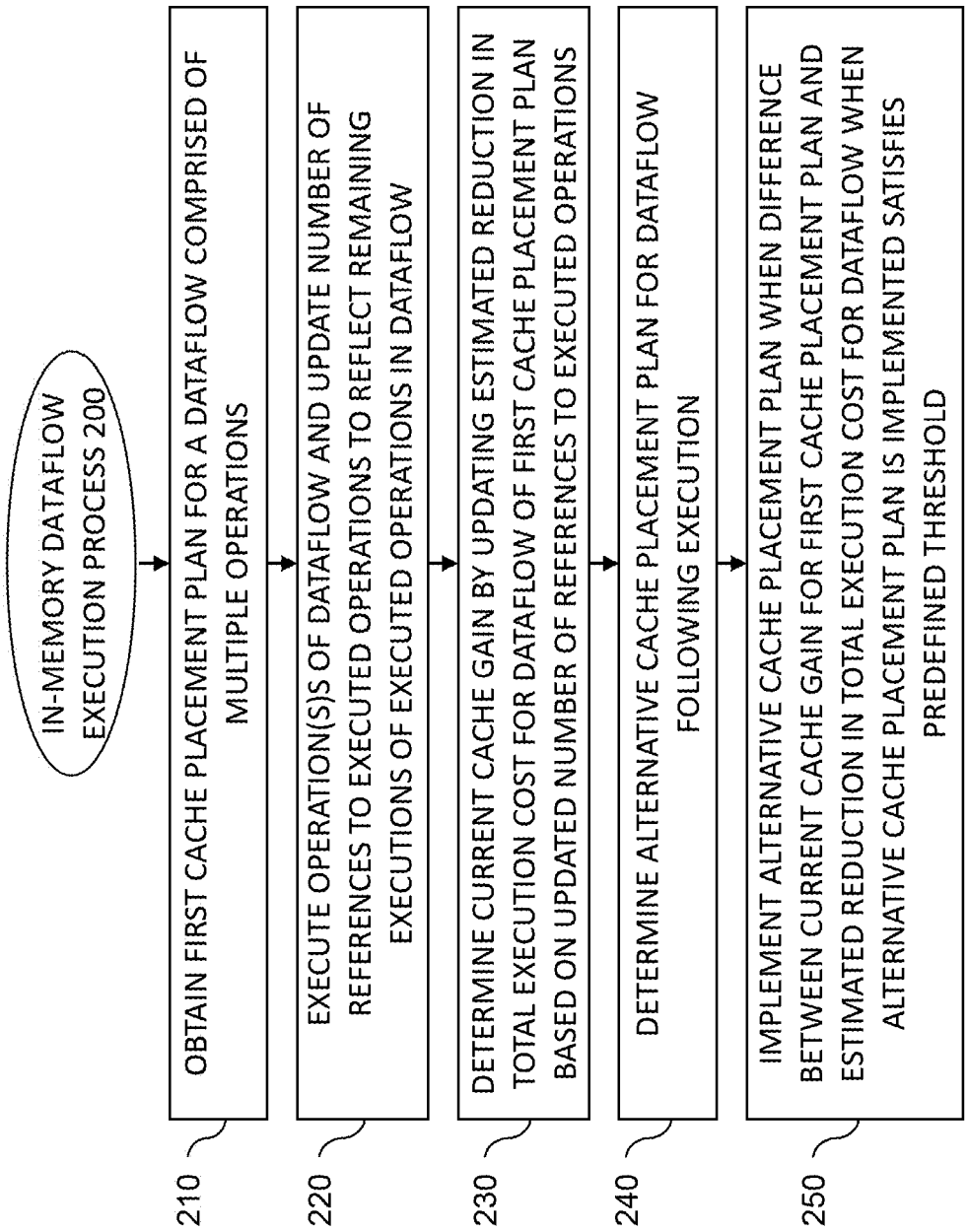
FIG. 2 is a flow chart illustrating an exemplary implementation of an in-memory dataflow execution process, according to one embodiment of the disclosure.

FIG. 2 is a flow chart illustrating an exemplary implementation of an in-memory dataflow execution process 200, according to one embodiment of the disclosure. As shown in FIG. 2, the exemplary in-memory dataflow execution process 200 initially obtains a first cache placement plan (for example, from an exemplary S-CACHE process 300, as discussed further below in conjunction with FIG. 3) during step 210 for a dataflow comprised of multiple operations. Generally, the first cache placement plan comprises a combination of output datasets of a subset of the operations in the input dataflow to cache based on an estimated reduction in a total execution cost for the dataflow when the first cache placement plan is implemented given an input dataset.

Thereafter, the exemplary in-memory dataflow execution process 200 executes one or more operation(s)s of the dataflow during step 220 (e.g., using dataflow executor 110) and updates a number of references to the executed operations to reflect remaining executions of the executed operations in the dataflow, as discussed further below in conjunction with FIG. 9.

A current cache gain is determined during step 230 by updating the estimated reduction in the total execution cost for the dataflow of the first cache placement plan based on the updated number of references to the one or more executed operations. An alternative cache placement plan is determined during step 240 for the dataflow following the execution (e.g., using the exemplary dynamic cache placement dataflow execution process 900 of FIG. 9).

Finally, the cache placement plan is optionally implemented during step 250 when a difference between the current cache gain for the first cache placement plan and an estimated reduction in the total execution cost for the dataflow when the alternative cache placement plan is implemented satisfies a predefined threshold criteria.

Large-scale data processing frameworks, such as Spark and Flink, have been adopted in the industry and academia. These frameworks employ a programming model in which the user defines a dataflow of operations that specify transformations on the input data. These operations are often lazy (or late) evaluated, as they define a logical plan that is only actually enacted when an action operation is executed (e.g., an operation that requires returning the results of the defined computation to the coordinating process (referred to as the driver program, in Spark)).

A side effect of the lazy execution model is that dataflows with more than one action incur multiple executions of their dependent transformations. This increases the cost of executing the dataflow substantially. To improve the performance of dataflows running under a lazy execution model, some dataflow engines provide mechanisms to persist the output of a transformation, avoiding the re-execution of precedent operations. This is called a caching operation. In this scenario, a user informs the system about the persistence strategy by altering the persistence mode of a dataset produced by an operation. The caching operation does not modify the lazy execution model, and merely indicates that the dataset produced by an operation should be kept in memory for future reuse, without the need for recomputation. Therefore, the use of a caching operation potentially avoids the increased cost incurred by multiple actions in a dataflow.

U.S. patent application Ser. No. 15/662,704, filed Jul. 28, 2017, entitled "Automatic Placement of Cache Operations for Complex In-Memory Dataflows," incorporated by reference herein in its entirety, describes an approach for the automatic placement of cache operations in complex dataflows that substantially optimizes the execution cost. A formal model is provided for the representation of the dataflow, which lends itself to the description of disclosed methods for the estimation of the number of executions and costs of operations and the automatic search for the best cache placement strategy.

One or more embodiments of the present disclosure leverage the techniques of U.S. patent application Ser. No. 15/662,704 to revise the cache placement strategy in a dynamic fashion. In the present context, the term dynamic refers to the fact that the approach changes the cache placement plan after the dataflow has been submitted for execution, potentially multiple times. In some embodiments, a method is provided for the execution of dataflows in in-memory fashion with dynamic cache placement.

U.S. patent application Ser. No. 15/662,704, in one or more embodiments, describes a static strategy that computes a substantially best cache placement based on a cost model that uses estimates on dataset size and transformation cost, in addition to a view of the workflow.

In the current programming model of in-memory dataflow frameworks, such as Apache Spark and Flink, the decision to cache datasets produced by transformations is a manual activity performed by the users. However, this decision is hard, particularly when the dataflow involves various transformations and actions, and/or includes loops or iterations, on which the operations may access only a fragment of the data, or when each iteration may require data generated by the previous one. In summary, the cache placement must typically consider the number of enactments of each transformation; the computational cost of transformations; and the computational cost to cache the datasets. Therefore, the decision to cache a dataset requires considerable effort to estimate at design time the number of operation invocations, the computational cost of transformations (individual and accumulated), and the computational cost to cache the produced datasets.

In a complex dataflow, multiple datasets are candidates for caching. The optimal cache placement strategy may involve the caching of multiple datasets, configuring a combinatorial problem. Considering dataflows comprised of a large number of operations, the decision of which datasets to cache often becomes infeasible to perform manually. Given that caching may heavily influence the execution cost of a dataflow, there is a need for an automatic approach to define optimal or near-optimal cache placement.

In-memory computing frameworks keep intermediate processed data in memory by default. However, if there is not enough RAM, such frameworks spill the data to disk, which reduces the dataflow performance drastically. Therefore, limited RAM memory is a constraint to consider when analyzing cache placement, since a cached dataset occupies memory space. For multiple cache placements, when adding a new cache, the user needs to deal with previously cached datasets, aiming at not including unnecessary disk I/O overhead. Another issue related to this constraint is that the majority of in-memory computing frameworks are written in a garbage-collected language. Garbage collection achieves reasonable performance by collecting garbage in large batches; consequently, the memory usage for the temporary storage of garbage must also be taken into account. The memory consumption and garbage collection invocations configure major concerns for the efficiency of dataflow executions and cache placement strategies.

In U.S. patent application Ser. No. 15/662,704, given a workflow and certain metrics defined through a cost model (such as a cost of the transformations; a cost of the actions to be executed; the cost of caching in memory and the size of an output dataset), it is possible to determine the substantially best caching strategy. However, to the extent that the actions are being executed, what is defined as a good caching strategy may change.

Thus, the following parameters may need to be considered:

Update Transformation costs:
  Due to outlier behavior—transformations whose cost may be sensitive to data outliers may lead to error in cost estimates; and
  Few recordings of transformation runs may lead to poor statistical cost estimates.
Variations in planned infrastructure:
  faults and malfunction of components of the infrastructure cause transformations and caching to present unexpected behavior:
    transformations taking longer to run; and
    data needed to be transferred due to node failure.
Cache cost due to error in dataset size estimates:
  estimates for intermediate datasets may differ from run time values, due to the results of data filtering transformations.
Memory limitations:
  discard cached outputs that are no more needed; and
  multiple caches surpassing memory limits.

This particular problem is stated as follows: given execution time costs and infrastructure information, one or more embodiments aim at computing a dynamic cache placement strategy using the cost model with updated information. A dynamic cache placement strategy defines the substantially optimal cache placement for the dataflow and revises that placement as specific execution choice-points are encountered.

As recognized in U.S. patent application Ser. No. 15/662,704, large-scale data processing frameworks are currently widely adopted in the industry and academia. These frameworks employ a programming model in which the user defines a dataflow of operations on the input data. In the present disclosure, such frameworks are considered in some embodiments with the particular execution strategy of lazy evaluation, such as Apache Spark. This programming paradigm is more attractive than executing an operation at the same time, which can delay the process. Lazy Evaluation assumes that substantially all transformations can be combined in a single transformation and executed together, it is only necessary to activate an action over them. Through this DAG (Directed Acyclic Graph), Spark maintains the record of every operation performed. That keeps track of each step through its arrangement of vertices and edges. Therefore, when any action is invoked, the DAG returns to the list of operations that will be triggered.

Although the lazy evaluation strategy offers many benefits, a side effect is that any transformation in the dataflow may be executed multiple times, as multiple references in the dataflow lineage of each action to the transformation output may exist. As the intermediate results of executing an action are not automatically persisted, this occurs whenever a transformation is in the dependency path of more than one action. Caching the appropriate datasets may avoid the re-execution of several transformations in the dependency path of the dataflow actions. Consider the following intuitive metrics, typically considered by users when deciding the placement of explicit caching operations:

(i) the number of references to each transformation in the dataflow;
(ii) the distance between transformations and actions;
(iii) the number of transformations in the dataflow that need to be executed prior to each transformation;
(iv) the associated cost of transformations; and
(v) the cost to access (read and write) a cached dataset.

Thus, deciding which datasets to cache is a non-trivial problem. This is highlighted by the fact that focusing on a single metric may frequently lead to undesired negative results. In complex dataflows, even selecting which of these metrics would be the most appropriate to be taken into account would require the programmer to have a deep knowledge about the dataflows, the cost of operations and even the infrastructure being considered for the dataflow execution.

Automatic Cache Placement

In one or more embodiments, the dataflow is represented as a directed acyclic graph (DAG) G, in which the nodes (vertices) are the operations, and the edges represent the data dependencies between them. Typically, the dataflow defined by the programmer implicitly defines such a graph, and syntactical analysis of a program suffices to derive it unambiguously. If this is not the case, the programmer may otherwise explicitly define the structure of the graph conforming to the formalization below.

Formally, a graph G is defined as a tuple G=(O, E), O={$o_1, o_2, \ldots, o_n$} is a set of nodes, and E={$e_1, e_2, \ldots, e_m$} is a set of directed edges e:($o_i \rightarrow o_j$), with $o_i, o_j \in O$. Each such edge states that operation $o_j$ depends on operation meaning that the datasets generated by $o_i$ are required for the execution of $o_j$.

$P^o$={p|e:(p→o)∈E} is defined as the set of operations that precede operation o. This denotes that o requires the output of all operations in $P^o$, which must be executed before it. Conversely, $F^o$={f|e:(o→f)∈E} is the set of operations that directly follow o. All the operations in $F^o$ require o's output, and thus o must be executed after them. Consider in this formulation that the results of action operations configure the outputs of the dataflow itself, which are not required for further transformations, and thus for any action operation o, $F^o$ is the empty set.

Consider the following cache-independent properties of the dataflow. These are properties that do not change as cache operations are defined. Recall that operations are known to be either transformations or actions a priori. Each operation o in the dataflow is defined in some embodiments to have a type property, denoted o.type, indicating whether it is a transformation or an action.

In order to reference the dependence relations among operations in the dataflow, these relations are represented as properties of the operations. Recall $P^o$ and $F^o$ as the sets of operations directly preceding and following operation o. These configure the precede (or prior operation) and follow properties of o, denoted o.pre and o.fol, respectively.

Consider the static properties that configure the cost model for the operations. They are the individual cost (o.ind), the cache write cost (o.wcache), and the cache read cost (o.wcache), respectively, abstractions of the computational times associated with the operation.

The individual cost is the cost of executing a transformation or action operation in a specified context. Notice that the context defines the size and features of the input dataset, and thus the estimate of the individual cost of an operation that consumes this dataset can be obtained by predictive models. The estimate of the individual costs of operations, at intermediate positions in the dataflow, further rely on predictive models of the outputs of their preceding operations.

The cache write cost denotes the computational cost to persist the output dataset of the transformation (e.g., to "cache that transformation"). Like the individual cost, the estimate of this cost relies on the prediction of the output of the operation—particularly, its size.

The cache read cost represents the cost of accessing a cached dataset resulting from the operation. The same observations as in the case of the cache write cost hold.

Next, consider certain cache-dependent properties of the operations that, therefore, depend on the current state, including the cache gain computation. The state dataflow cost is the total cost to execute the dataflow in a given state, in relation to the previous definitions. Finally, the search algorithm S-CACHE which leverages the cache gain estimate as a heuristic for guiding the search, as discussed further below in conjunction with FIG. 3.

As the exemplary S-CACHE algorithm comprises a search, consider the state structure. Each such state represents a cache decision, i.e., a certain placement of zero or more cache operations on the dataflow. Recall, however, that the disclosed algorithm executes before the dataflow execution, and that the state corresponds to an intermediate result of the search algorithm in a search state, and not an actual dataflow execution state. The alternative combinations of cache placements in a dataflow are referred to as alternative caching states. The state structure comprises an annotation, for each operation in the dataflow, of whether that operation is to be cached or not.

For the remainder of the discussion, assume the term is-cached(o,S) to denote the Boolean value of this annotation for operation o in state S. Refer to the state ini in which no operations are cached to be the initial search state, such that is-cached(o,ini) is false for all o∈O.

As discussed hereinafter, certain cache-dependent properties of the operations are calculated given a state. These are used to define the computation of the total dataflow cost in a state (the state cost) and the cache-gain heuristic that guides the search algorithm.

The accumulated cost of a certain operation is referred to as the cost of executing that operation plus all its requirements. This value depends on the state, as the cost of the requirements depends on whether preceding operations have to be executed or if their results are already cached.

Formally, the accumulated cost of operation o is the cost of executing o itself plus a cost factor of each operation p that precedes it, p∈o.pre. If p is cached that factor is the cost of reading the cached data generated from p, p.rcache. However, if p is an un-cached operation, o considers the accumulated cost of p as that factor. In this recursive definition, the base cases are the source operations of the dataflow, with no preceding operations. Thus, the accumulated cost of o in S is calculated as follows, in some embodiments:

$$Acc(o, S) = o \cdot ind + \sum_{p \in o \cdot pre} \begin{cases} p \cdot rcache & \text{if } is\text{-}cached(p, S) \\ Acc(p, S), & \text{otherwise} \end{cases}$$

Consider the case, in the present example, when no operations are cached (the ini state). The accumulated cost of T1 in this initial state ini is its individual cost, as it has no preceding operations, and thus Acc(T1,ini)=39.30. The accumulated cost of A1 in ini is its own individual cost (=4) plus the individual cost of T1, which precedes it, and so Acc(A1,ini)=43.30.

Assume a state S1 in which T1 is cached. In that case, the accumulated cost of A1 instead takes into account the cost of accessing the cached data of T1 (=16), instead of the cost of executing T1. Thus, Acc(A1,S1)=20.

Also consider the number of executions of each operation in a given state. The number of executions of an operation is a useful property for reasoning about the impact of caching that operation in the costs of the other operations in the dataflow. When no operations are cached, the number of executions of an operation corresponds to the number of references to that operation (the number of lineages of actions in which the operation appears). However, when the operation is cached, it is executed only once, as future references to it reuse the cached results instead of triggering re-executions. This, in turn, affects the number of executions of the operations that precede it. The number of executions of operation o in state S is recursively defined, as follows:

$$Execs(o, S) = \begin{cases} 1 & \text{if } o \cdot \text{type is action or} \\ & is\text{-}cached(o, S), \\ \sum_{f \in o \cdot fol} Execs(f, S), & \text{otherewise} \end{cases}$$

In the present example, with no operations cached, $T1^{ini}.execs=4$. If T1 is cached, however, $T1^{S1}.execs=1$.

Finally, the cache gain property of an operation o in state S is an estimate of the costs spared by additionally caching that operation from that state, stated as follows:

Cache-gain(o,S)=((Execs(o,S)−1)×Acc(o,S))−o·wcache.

This calculation takes into account the spared cost of caching the operation and the cost of the caching operation itself. The spared cost is the number of executions of the operation that would be spared with the caching (all but one, Execs(o, S)−1) multiplied by its accumulated cost Acc(o, S). The cost of the caching operation, o.wcache is subtracted from the spared cost to yield the cache gain estimate of o in S.

The cache gain estimate does not consider the impact of the cache read costs of the following operations, which is taken into account in the computation of the accumulated cost. The simplicity of the cache gain estimate is important, in some embodiments, as it must be calculated many times in our search procedure. The possibility of quickly estimating the cache gain provides a heuristic to guide the generation of states in the search, allowing an approach based on a generate-and-test recomputation of the operation properties to be avoided. This motivates the use of the cache gain as a straightforward heuristic in the automatic search for the best combination of cache placements.

As an evaluation of the dataflow in a given state, the cost of the state is defined in some embodiments as follows. The cost of the state intuitively represents an expectation of the total execution cost of the dataflow when the set of caches that the state represents are defined, as follows:

$$\text{Cost}(S) = \sum_{o \in O} \begin{cases} Acc(o, S) & \text{if } o\text{-type is action,} \\ o \cdot wcache & \text{if } is\text{-}cached(o, S). \\ 0, & \text{otherwise} \end{cases}$$

Recall that the state ini in which no operations are cached is referred to as the initial state of the dataflow. This initial state configures the starting point for the search for the best cache decision.

Notice that in the calculation of the dataflow cost in a state, the only contributing factors, in one or more embodiments, are the accumulated costs of the actions and the cache write costs of operations. This follows from the definition of the accumulated cost, which already includes the costs of (repeated) executions of the transformations that are required by the actions, as well as the costs of (repeated) access to the cached data by cached transformations. The cache write cost is considered at most once for each transformation—transformations cannot be cached multiple times.

FIG. 3 illustrates exemplary pseudo code for an S-CACHE process 300, according to an embodiment of the disclosure. Generally, the exemplary S-CACHE process 300 performs a search over a large number (potentially all) of possible states. If no limits are imposed in the S-CACHE process 300, it performs a search over the entire state-space, keeping in memory at any given time the state with the lowest estimate cost. Due to the completeness, S-CACHE process 300 is substantially guaranteed to find the state with the substantially lowest cost as yielded by the cost model. However, the number of possible states grows exponentially regarding the size of the dataflow. Recall that one goal is to assign a value to the Boolean property is-cached to each transformation. The number of possible states in a dataflow with n transformations is thus $2^n$.

As shown in FIG. 3, the exemplary S-CACHE process 300 receives as argument the initial state ini in which, for all operations o, o.is-cached is false. The S-CACHE process 300 also receives as argument the beam limit that prunes the search space. Notice state memory restrictions are not explicitly stated in the formulation below, as the cost model definition does not include predictions for the memory footprint of the datasets generated by operations. With such a model at hand, the exemplary S-CACHE process 300 can be expanded to halt the generation of states upon reaching the limit of the memory dedicated for caching, in a similar manner as KeystoneML.

As shown in FIG. 3, the exemplary S-CACHE process 300 iteratively generates new candidate states in a list of open states, adding them to the closed states list, used to avoid expanding states twice, as they are explored. The best state (e.g., the one with the substantially lowest cost), is kept at all times. Each explored state is removed from the open list and compared to the best, taking its place if it has the lowest cost. The resulting best state at the end of the iteration is returned as the solution.

For each explored state, new states are generated, each caching an additional operation. All operations are sorted by the cache gain estimate, and only a maximum of the beam operations ops yield new states. These are added to the open list to be explored in order of substantially lowest cost. In this way, the explored state is substantially always the one with the substantially lowest cost so far, and if at any time the search procedure is interrupted, best is substantially guaranteed to be the substantially best state explored so far.

In the present description, the generation of new states is abstracted. In practice, the generation of a new state S' from S by additionally caching operation o requires the recomputation of the cache-dependent properties. In practice, computing these properties of the operations in S' from scratch is avoided by copying the data structure of S and recursively propagating changes to the accumulated costs (and the number of executions) of the operations that precede (or follow) the additionally cached operation o. Still, this configures the most expensive part of the algorithm, which reinforces the importance of using the (cheaper) cache gain as means of estimating (and limiting the number of) the operations to cache.

Notice also that per the definition of the cache gain estimate, actions and operations already cached in S have a cache gain of zero. Hence, they are excluded from generating new candidates. This avoids having the algorithm consider states where the same operation is cached twice.

The result of the exemplary S-CACHE process 300 is a cache plan, to be applied to the dataflow before its execution. If the cost model estimates are wrong by a significant margin (e.g., due to changes in the infrastructure or wrong estimates over the computation times or dataset features), the cache plan dictated by the exemplary S-CACHE process 300 may become sub-optimal or even detrimental. To this end, in the following disclosure, a novel computational approach is provided to automatically revise, in a dynamic fashion, the cache placement strategy for the efficient execution of a given complex dataflow.

Motivating Example

A motivating example is provided that illustrates the dynamic cache placement problem. The following example corresponds to an astronomy workflow defined using the Apache Spark framework. See, e.g., F. e. a. Porto, "Constellation Queries Over Big Data," *CoRR abs/*1703.0 (2017). The Constellation Query dataflow searches astronomy catalogs looking for geometric patterns. Its Spark implementation can be mapped to other in-memory dataflow frameworks.

Figure 4:
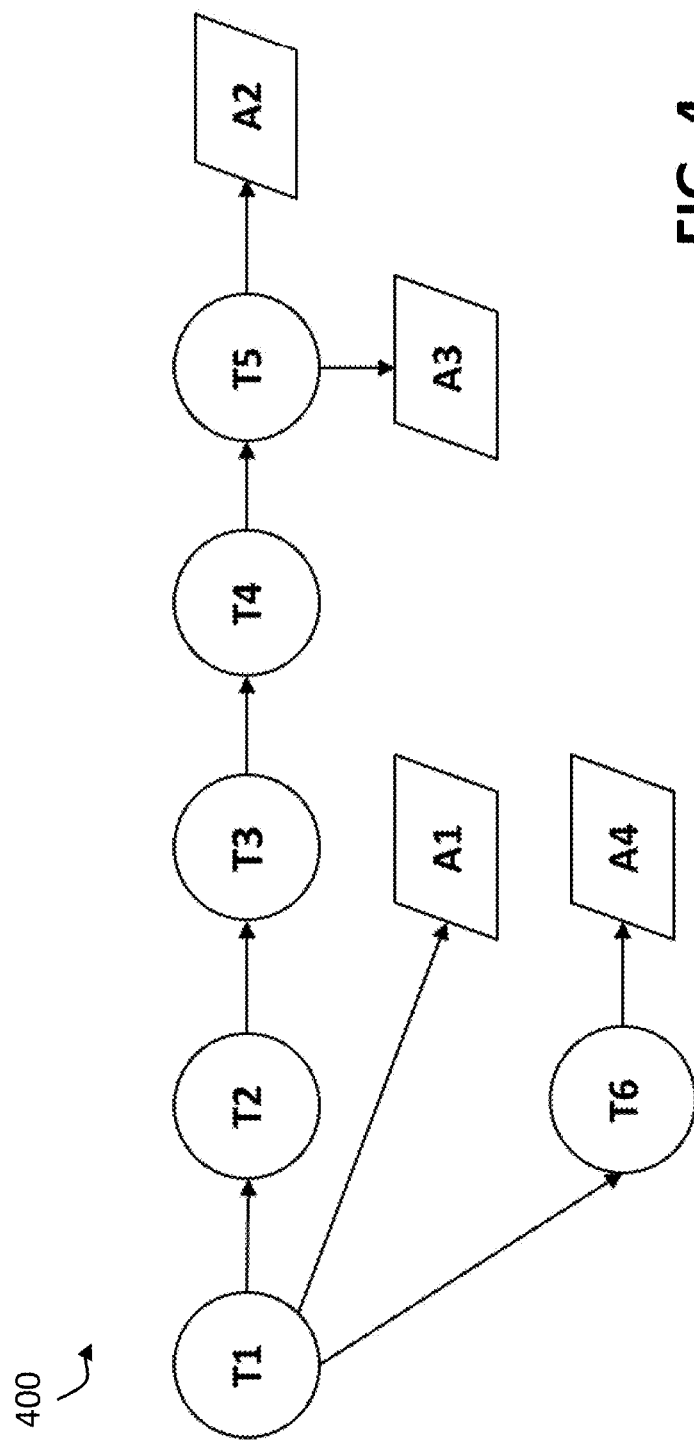

FIG. 4 illustrates an exemplary Constellation Query dataflow 400, comprised of six transformations (T1 to T6) triggered by four actions (A1 to A4). The directed edges in the dataflow 400 represent the dependencies between the datasets produced/consumed by the operations. For example, the dataset produced by transformation T1 is consumed by transformations T2 and T6 and by the action A1, while the dataset produced by transformation T5 is consumed by actions A2 and A3.

FIG. 5 illustrates an exemplary dataflow operations table 500, describing details of the operations of dataflow 400 of FIG. 4. The seemingly promising candidate caches, in dataflow 400, are transformations T1, T2, T3, T4 and T5, since these are referenced by more than one action in the dataflow (transformation T6 is not considered in the discussion below, as it is not reused).

In some embodiments, the selection of one or more of these transformations to be cached will depend on the cost of their execution, the size of the output dataset and its proximity to the action, since they all share the same number of references. The order of execution of the actions coincides with the sub-index assigned in FIG. 4. Under these conditions, the cache strategy is selected with an input dataset of 1 GB, and the S-CACHE process 300 of FIG. 3 is initialized as an instantiation of U.S. patent application Ser. No. 15/662,704. The exemplary S-CACHE process 300 is initialized with the DAG of execution of the workflow and the costs of the transformations and actions extracted from a provenance model, as well as the cost of reading and writing in cache of an output dataset.

FIG. 6 illustrates an exemplary operations properties table 600 that summarizes the costs extracted from the provenance model for the exemplary dataflow 400 of FIG. 4, using the abbreviations introduced above.

Figure 7:
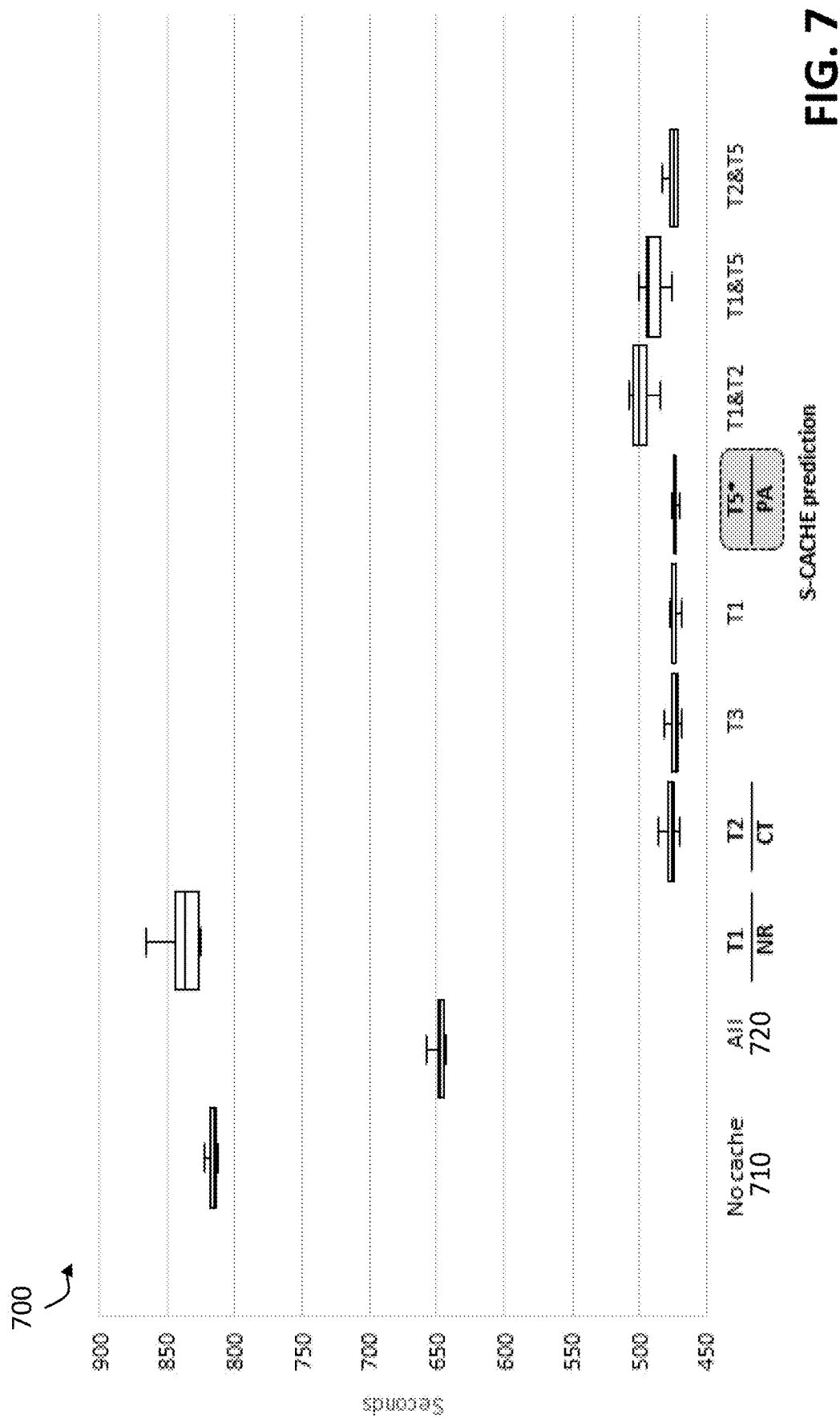

FIG. 7 illustrates boxplots 700 of the execution times (y-axis) of each cache decision (x-axis) (e.g., indicated by intuitive caching criteria). The 'No cache' decision 710 corresponds to the dataflow as-is. The 'No cache' decision 710 resulted in an average execution time of 815.66 seconds. The 'All' decision 720 corresponds to the strawman approach of caching each transformation with multiple references. The 'All' decision 720 results in an average execution time of 646.80 seconds. The 'All' cache decision 720 in this test scenario is only considered to illustrate that (as expected) caching all datasets does not reduce the execution time significantly when comparing to other caching decisions, which is explained by the overhead incurred by the cache transformations offsetting the initial gains, and the diminishing returns of adding more and more caches. Furthermore, in order to cache all transformations, more memory has to be set aside from the computation and dedicated for caching.

In addition, FIG. 7 represents the execution times of cache decisions highlighting the decisions for transformations T1, T2 and T5, indicated by the criteria NR (the number of references to that transformation), CT(the execution cost of the transformation), and PA (the proximity of the transformation to actions), respectively. The best average decision is a caching of transformation T5 (denoted by an asterisk), selected by the exemplary S-CACHE process 300 (denoted by a gray dashed square).

Now, consider the order of execution of the actions in the dataflow. The transformation T5 is used by the Actions A2 and A3, so when action A3 ends it will no longer be necessary and will be occupying memory that could be used in the execution of action A4. One way to solve the problem is rearranging the order of execution of actions or freeing cache memory after the action A3.

Figure 8:
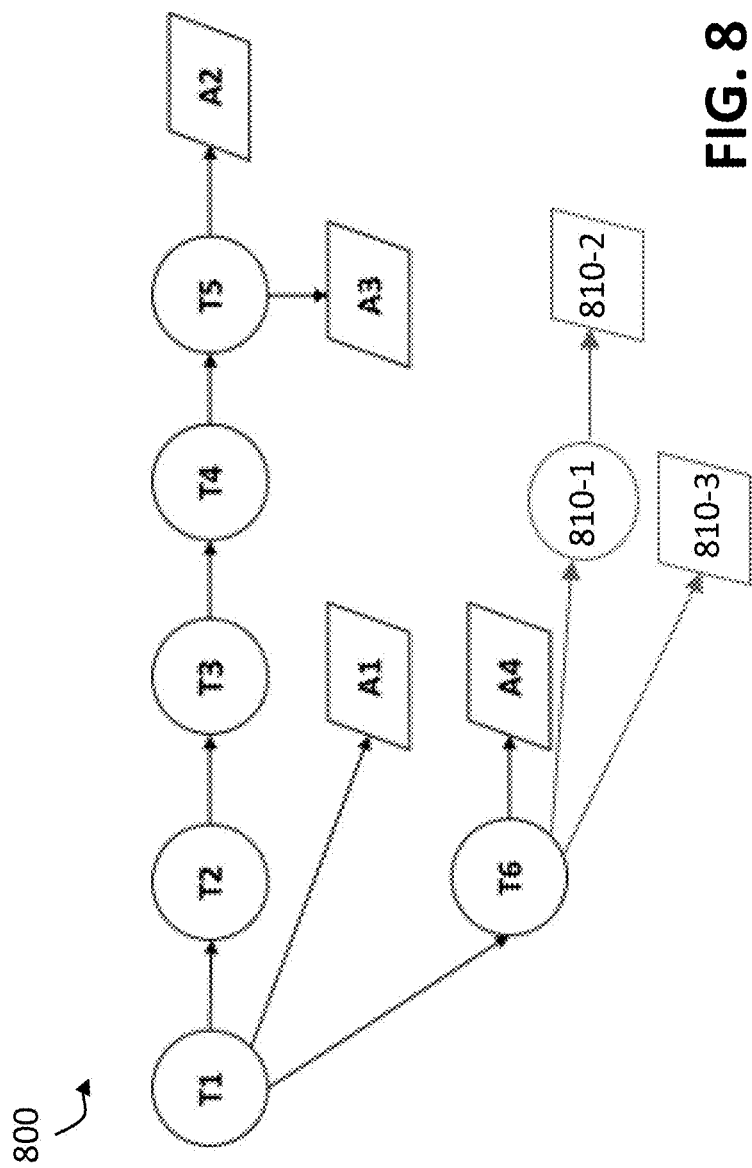

FIG. 8 illustrates an updated Constellation Query dataflow 800, based on the exemplary Constellation Query dataflow 400 of FIG. 4, now with additional actions 810-1 through 810-3. Thus, in addition to the metrics generated through the transformation T6, new metrics are generated that cause the workflow to become more complex.

In the example of FIG. 8, the transformation T5 might still be the substantially best option for caching, due to the number of transformations that stop being executed if transformation T5 is persisted in memory. However, as indicated above, after action A3 is executed this transformation T5 becomes unnecessary and transformation T6 could be a new better option. It would be enough to free the T5 transformation from memory and to initialize the exemplary S-CACHE process 300 of FIG. 3 again with what has not yet been executed from the new dataflow 800 and the respective costs to have a new caching strategy.

These types of decisions can contribute to a better use of physical memory and at the same time continue to reduce the costs of the dataflows that are executed.

In-Memory Dataflow Execution with Dynamic Cache Placement

The disclosed dynamic placement approach takes advantage of provenance data that becomes available as the workflow state information is updated during execution of operations to improve caching. As the workflow is executed, real-time information is gathered as provenance data and the initial workflow view is modified by the completion of actions. Thus, the cost model and the workflow view can be updated with this information gathered in real-time. The updated cost model and workflow states to compute can be leveraged into a new cache placement strategy, potentially allowing for the eviction from memory of cached datasets that become unnecessary.

FIG. 9 illustrates exemplary pseudo code for a dynamic cache placement dataflow execution process 900 (also referred to as XD-CACHE), according to one embodiment of the disclosure. In the following description of the dynamic cache placement dataflow execution process 900, an implementation is assumed of an algorithm for the automatic cache placement similar to the S-CACHE process 300 of FIG. 3, where the inputs are the dataflow submitted for execution, a cost model, the infrastructure and the input dataset; and the produced outputs are: a cache placement strategy and the expected gain (reduction in execution cost), obtained from the application of that strategy.

Any algorithm that is capable of determining a substantially optimal cache placement strategy from a dataset, a cost model and a definition of the dataflow as a DAG can be used instead of the S-CACHE, however, as would be apparent to a person of ordinary skill in the art. An evaluation unit (EU) is a run-time reference point to the workflow cache-placement strategy re-evaluation. As an example, an EU can happen after the evaluation of a workflow action or at the end of a data partition workflow execution stage. In the following description of the dynamic cache placement dataflow execution process 900, it is assumed that EUs can be identified with no concerns in the dataflow data-structure.

It is noted that the dynamic cache placement dataflow execution process 900 of FIG. 9 differs from the S-CACHE process 300 of FIG. 3 in that the latter returns a cache strategy (and its expected benefit), while the former actually executes the dataflow dynamically changing the cache strategy.

As shown in FIG. 9, the exemplary dynamic cache placement dataflow execution process 900 works as follows. An initial cache plan and corresponding estimate gain are computed leveraging an algorithm such as the S-CACHE process 300. This cache plan is applied to the dataflow w.

The exemplary dynamic cache placement dataflow execution process 900 then iterates over a loop comprised of an execution stage and a cache re-evaluation stage while there are still evaluation units to execute. These starting and ending points of each of these stages are denoted by the comments in the dynamic cache placement dataflow execution process 900.

The dynamic cache placement dataflow execution process 900 returns the final updated cost model, infrastructure and datasets representations. These values can be stored and over time provide a richer database of cost models for dataflow executions.

Execution Stage

In the execution stage, the exemplary dynamic cache placement dataflow execution process 900 executes a number of operations until the next evaluation unit and updates the relevant structures with the observed information. First, a Trace is collected from the execution of the operations up to the next evaluation unit. This is done via the RUN_EVALUATION_UNIT auxiliary function. Generally, RUN_EVALUATION_UNIT is a function that executes part of the dataflow w over dataset d in infrastructure i and returns a Trace. In the exemplary implementation, this execution comprises the execution of all transformations in the lineage of one action. This corresponds to the execution of the dataflow up until the next evaluation unit. Thus, Trace is a data structure that represents the executed operations since the last EU, comprising the provenance data and the execution times of all operations executed, captured through any kind of monitoring mechanism.

Then, the cost model m, infrastructure i and datasets d are updated with the information in the Trace via the auxiliary functions UPDATE_MODEL, EVAL_INFRASTRUCTURE and PROVENANCE_DATASETS, respectively.

UPDATE_MODEL computes the error in the cost estimates of the transformations that were executed since last evaluation, based on the difference between original estimates and the actual execution times, and updates the cost model accordingly. The resulting cost model m considers the costs observed in the execution of the Trace.

One implementation of this method is to replace the expected execution time of each operation, in the cost model, by the latest observed value (e.g., the one in the Trace). More complex approaches may benefit from historical data, updating the values as aggregations (e.g., averages) of one or more past executions. A related discussion on how the cost model can be structured is given in U.S. patent application Ser. No. 16/040,774, filed simultaneously herewith, entitled "Dataflow Execution Time Estimation for In-Memory Distributed Processing Framework," incorporated by reference herein in its entirety, where the update of the cost model, in some embodiments, is triggered by an observed difference (between the expected time and the observed value) greater than a defined threshold.

EVAL_INFRASTRUCTURE updates the representation of the available infrastructure considering variations to the environment, if any. The actual data structure for the representation of the infrastructure environment is outside the scope of the present disclosure. Any such structure that contains the relevant information for the execution of S-CACHE (or a similar algorithm) and for the execution of RUN_EVALUATION_UNIT can be used, as would be apparent to a person of ordinary skill in the art. Typically, this would configure the number of worker nodes available in a distributed processing environment, and their configuration (e.g., CPU cores, memory, network bandwidth capacity).

The identification of variations implemented by EVAL_INFRASTRUCTURE in other implementations is minor—any change in any value configures a new infrastructure. More complex implementations may take into account the generalization of aspects of the infrastructure, e.g., considering classes of environments. In such an example, changing from 16 to 20 worker nodes, for example, may not configure a change in class; but changing the total memory of each of the 16 workers from 64 GB to 128 GB may configure a relevant variation (and thus a different environment class). These classes can thus be defined based on the relevance of the aspect for the typical computational workloads in the environment (e.g., the number of worker nodes not mattering after a certain number, due to reaching a ceiling in parallelism; and the increase in memory mattering due to that being a typical bottleneck for the execution of tasks). In some embodiments, pattern-matching and pattern-generalization algorithms can be used for this kind of generalization.

PROVENANCE_DATASETS updates the representation of the input datasets based on the updated dataflow and the original datasets. In one configuration, all operation-output datasets are collected and combined into a larger dataset, indexed by the operation that generated them. Then RUN_EVALUATION_UNIT and the exemplary S-CACHE process 300 (or a similar algorithm) can identify the relevant dataset for their operation.

Cache Re-Evaluation Stage

The exemplary dynamic cache placement dataflow execution process 900 of FIG. 9 then proceeds to the cache re-evaluation stage. This stage only takes place if there are still multiple evaluation units to be reached in the execution in the dataflow. When there is a single evaluation unit to be reached, it typically does not make sense to alter cache plans as all operations (by definition) will be executed at most once. The exemplary Cache Re-Evaluation Stage starts by updating the references in the dataflow to reflect that an evaluation unit was reached. The exemplary Cache Re-Evaluation Stage then revises the need for the applied caches in the current strategy. Those caches that are no longer needed (caches of operations that have zero references) are evicted, freeing the memory for computation (or additional caches).

After these updates have all been considered, the expected gain from the (remaining) caches in the currently applied strategy is updated. The UPDATE GAIN function considers the current configuration of the dataflow and the updated cost model. Recall that the updated cost model already comprises the differences between the cost model used to devise the cache plan and the actual observed costs in the execution of the Trace.

Finally, the exemplary dynamic cache placement dataflow execution process 900 considers whether the current cache plan should be revised. A new potential alternative cache cache plan and its corresponding cache gain are computed via the exemplary S-CACHE process 300 of FIG. 3. Then, if the estimated cache gain of the alternative plan is greater than the remaining estimated gain of the current plan (best_gain) by a relevant margin (e.g., greater than the threshold parameter), the new cache plan is applied.

EXAMPLE

Consider the example updated dataflow 800 from FIG. 8 as the input argument w and assume appropriate values for the remaining arguments are provided. In this example, there will be 6 evaluation units to evaluate the cache decisions after each action. The execution stage will take place 6 times, and the cache re-evaluation stage will take place 5 times, for all actions but the last.

Figure 10A:
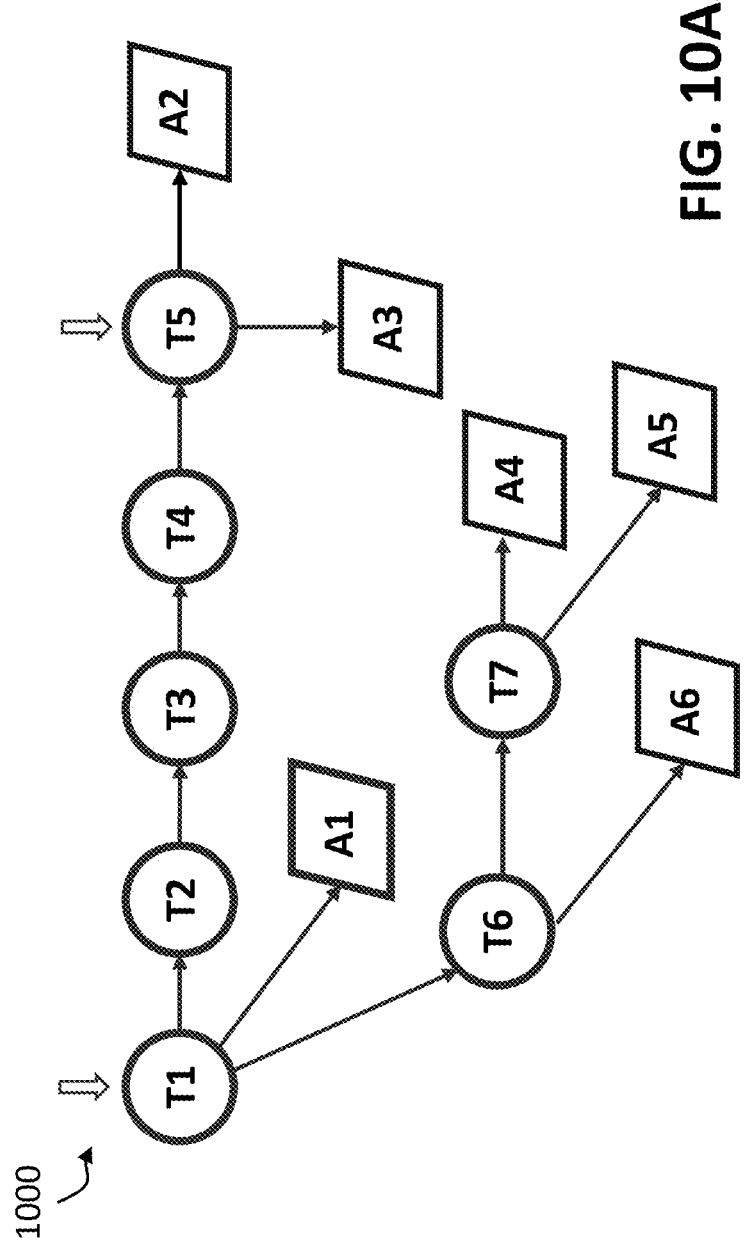

FIGS. 10A through 10F illustrate various cache placement strategies over time during execution of a dataflow 1000, according to some embodiments of the disclosure. As shown in FIG. 10A, an initial execution of the exemplary S-CACHE process 300 of FIG. 3 yields as a substantially best initial cache plan the caching of transformations T1 and T5, as highlighted by the arrows in FIG. 10A.

Upon entering the execution and cache re-evaluation loop of the exemplary dynamic cache placement dataflow execution process 900 of FIG. 9, action A1 is executed with the results of transformations T1 and T5 being cached according to the initial cache plan. At the end of this execution, all costs are updated of transformations, actions, and output dataset sizes and a verification confirms that there were no failures or changes in infrastructure.

Since there are still multiple actions to be executed in the dataflow 1000, the exemplary dynamic cache placement dataflow execution process 900 re-evaluates the current cache strategy. The references of the lineage of action A1

Figure 10B:
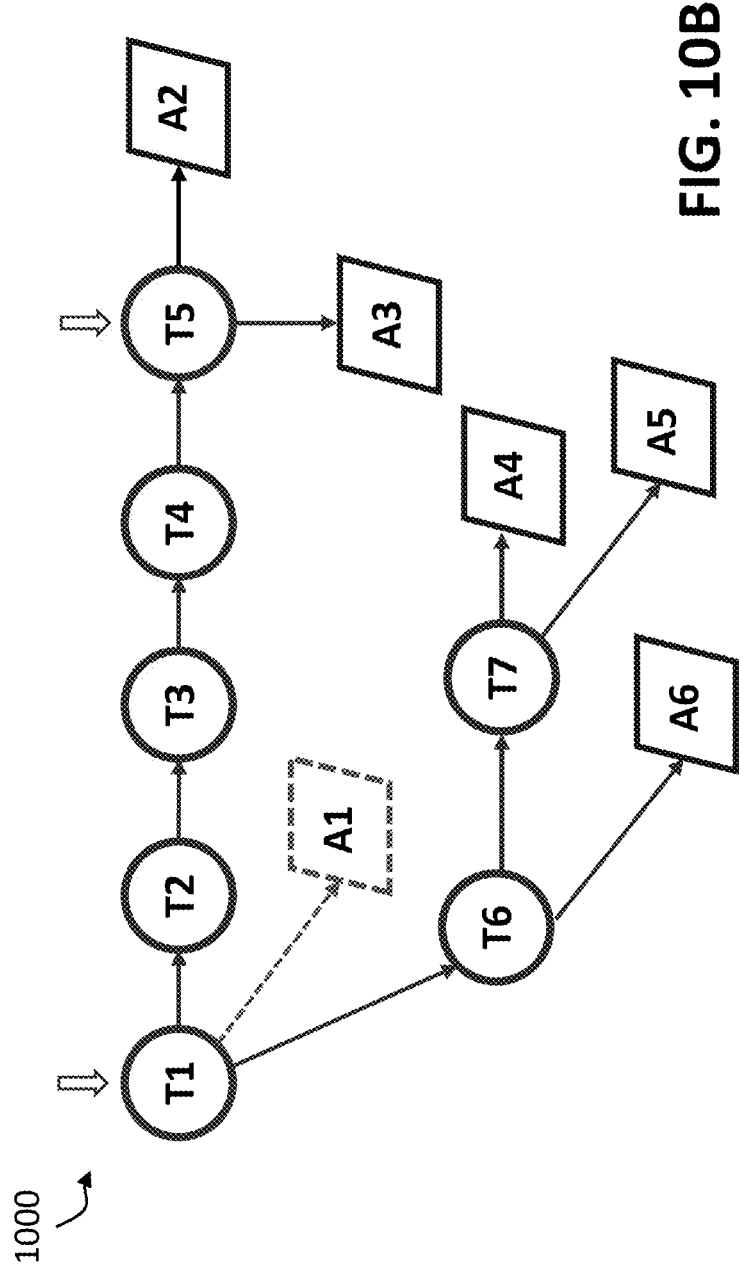
Figure 10D:
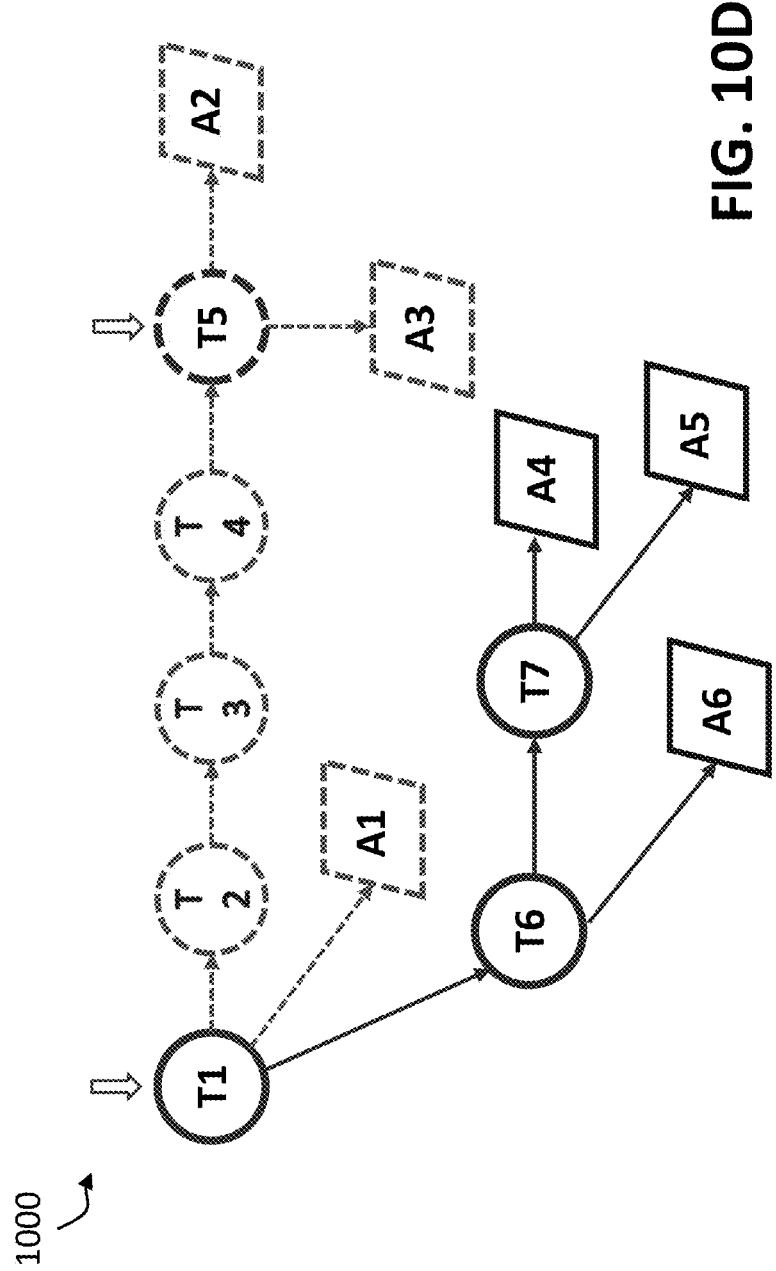

(last executed) are removed from the dataflow 1000, as shown by the dashed box in FIG. 10B.

Thereafter, cached operations T1 and T5 are checked for future references. Since cached operations T1 and T5 still belong to the lineages of all remaining actions (transformation T1) and of actions A2 and A3 (transformation T5), the cached items are not un-cached.

The estimate of the gain from the current caching (of T1 and T5) is updated. Since the costs of the caching operations have already been paid in the execution of action A1 but the results are still going to be reused, the estimated gain of the current strategy is not changed.

An alternate cache plan is then computed via the S-CACHE process 300 of FIG. 3, and its estimated gain is compared to the gain of the current strategy. In this case, the current strategy prevails and is kept for the next iteration of the loop.

In the next iteration of the loop by the exemplary dynamic cache placement dataflow execution process 900, in the execution stage, action A2 is executed and its Trace is collected. All costs are again updated of transformations, actions, output dataset sizes and a verification confirms that there were no failures or changes in infrastructure based on the Trace. Also, there are again multiple actions to be executed in the dataflow, so the dynamic cache placement dataflow execution process 900 proceeds to the cache re-evaluation stage. The references of the lineage of action A2 (last executed) are removed from the dataflow. This current state of the dataflow after execution of action A2 is represented in FIG. 10C.

The cache re-evaluation stage in this state proceeds similarly to the previous iteration.

In the following iteration of the loop by the exemplary dynamic cache placement dataflow execution process 900, action A3 is executed. After the updating of the model, infrastructure and dataset representations, the references from action A3 are removed and the dataflow 1000 is represented by the following structure shown in FIG. 10D (still with data from T1 and T5 cached).

Now, the check over the cached operations T1 and T5 by the dynamic cache placement dataflow execution process 900 indicates that the number of references of transformation T5 is zero. This means that the dataset resulting from that operation is evicted from cached memory through a call to UNCACHE.

Figure 10E:
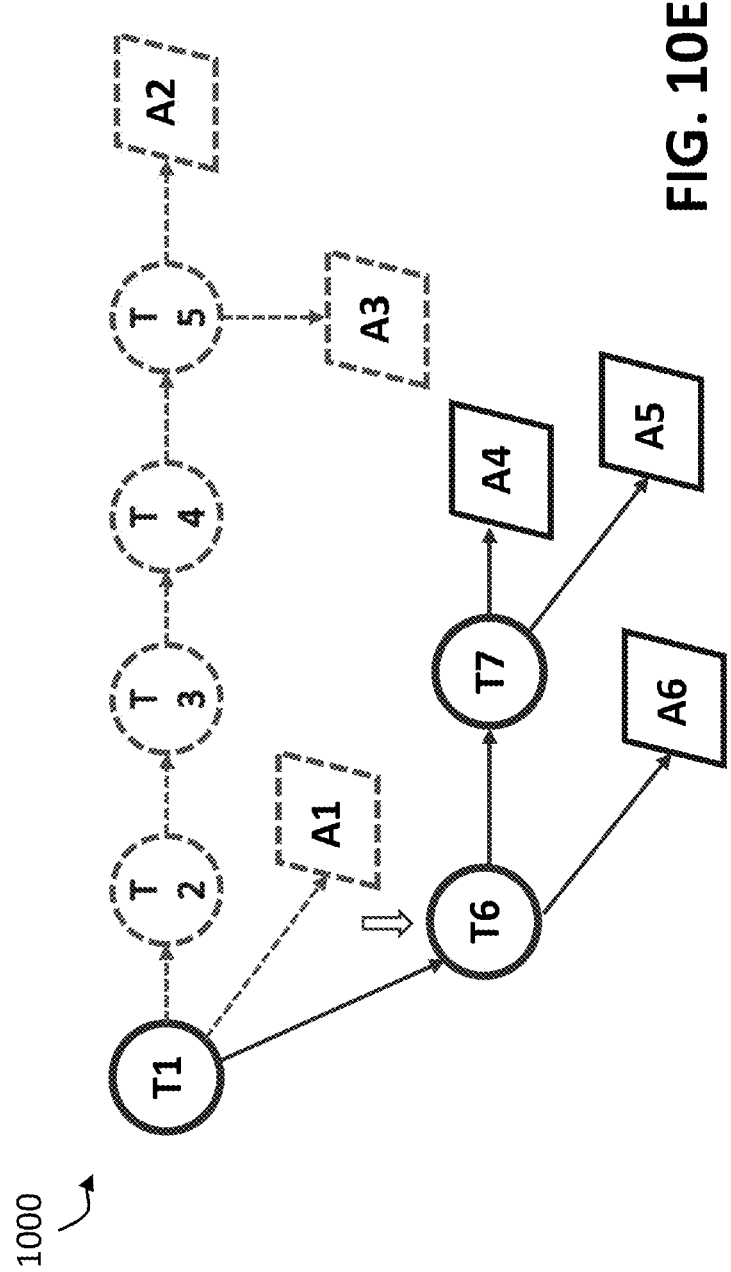

When the computation of the updated gain of the strategy returns, the dynamic cache placement dataflow execution process 900 now considers only that the results of T1 are to be reused. This means that the best_gain of the current strategy may significantly diminish. Thus, when a new alternative strategy and corresponding gain are calculated, it is discovered that the caching of transformation T6 is now considered substantially optimal for the remaining evaluation units. Notice that the cache of T6 subsumes the cache of T1, hence the application of alternative_cache (e.g., a revised cache strategy) to the remaining dataflow in fact implies in the un-caching of T1 as well, as shown in FIG. 10E.

FIG. 10F illustrates the state of the dataflow 1000, after the executions of actions A4 and A5 (when only one evaluation unit (action A6) remains). In this state, the execution stage still takes place (there is one evaluation unit yet to reach). However, since there are not multiple evaluation units, the cache re-evaluation stage is skipped.

The main loop of the exemplary dynamic cache placement dataflow execution process 900 then is skipped as there are no further evaluation units in w and the algorithm terminates by returning the updated cost model, the infrastructure and the datasets representations.

In one or more embodiments, the present disclosure provides a computational approach to automatically revise, in a dynamic fashion, a cache placement strategy for an efficient execution of a given complex dataflow.

One or more embodiments of the disclosure provide improved methods, apparatus and computer program products for in-memory dataflow execution with dynamic placement of cache operations. The foregoing applications and associated embodiments should be considered as illustrative only, and numerous other embodiments can be configured using the techniques disclosed herein, in a wide variety of different applications.

It should also be understood that the disclosed dynamic cache placement techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for in-memory dataflow execution with dynamic placement of cache operations may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based dynamic cache placement engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based dynamic cache placement platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 11 and 12. These platforms may also be used to implement at least portions of other information processing systems in other embodiments.

Figure 11:
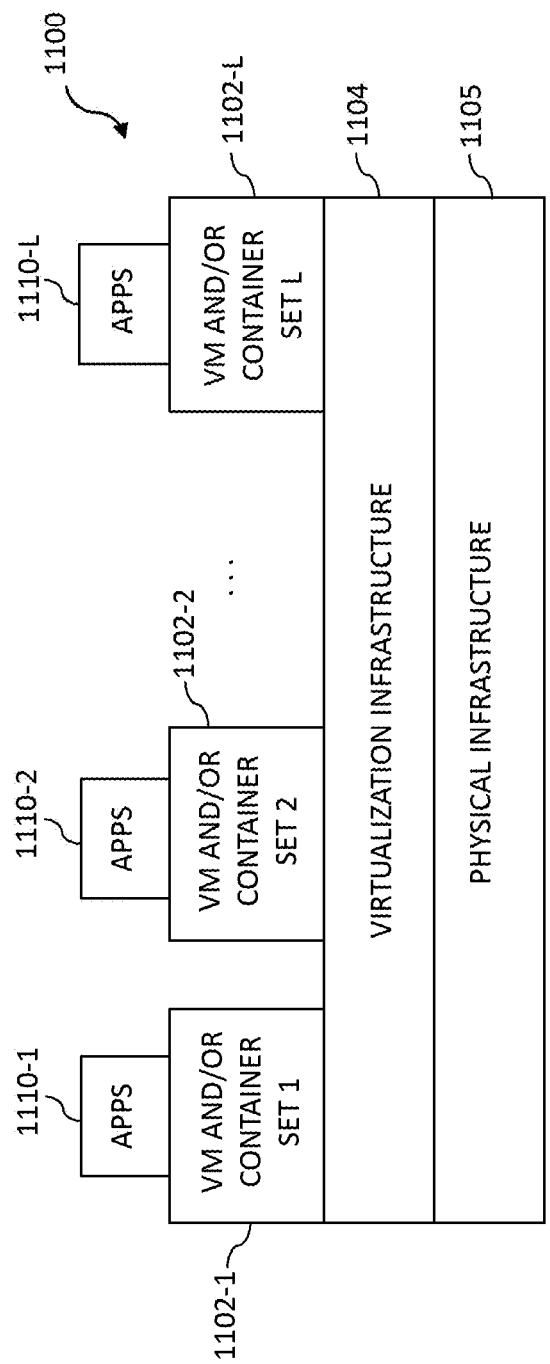
FIG. 11 illustrates an exemplary processing platform that may be used to implement at least a portion of one or more embodiments of the disclosure comprising a cloud infrastructure.

FIG. 11 shows an example processing platform comprising cloud infrastructure 1100. The cloud infrastructure 1100 comprises a combination of physical and virtual processing resources that may be utilized to implement at least a portion of the in-memory dataflow execution environment 100. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. Such implementations can provide dynamic cache placement functionality of the type described above for one or more processes running on a given one of the VMs. For example, each of the VMs can implement dynamic cache placement control logic and associated dynamic cache placement functionality for one or more processes running on that particular VM.

An example of a hypervisor platform that may be used to implement a hypervisor within the virtualization infrastructure 1104 is the VMware® vSphere® which may have an associated virtual infrastructure management system such as the VMware® vCenter™. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system. Such implementations can provide dynamic cache placement functionality of the type described above for one or more processes running on different ones of the containers. For example, a container host device supporting multiple containers of one or more container sets can implement one or more instances of dynamic cache placement control logic and associated functionality for use in generating a cache placement plan during execution of a dataflow.

As is apparent from the above, one or more of the processing modules or other components of the exemplary in-memory dataflow execution environment 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises at least a portion of the given system and includes a plurality of processing devices, denoted 1202-1, 1202-2, 1202-3, . . . 1202-K, which communicate with one another over a network 1204. The network 1204 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1202-1 in the processing platform 1200 comprises a processor 1210 coupled to a memory 1212. The processor 1210 may comprise a microprocessor, a microcontroller, an application specific integrated circuit (ASIC), a field programmable gate array (FPGA) or other type of processing circuitry, as well as portions or combinations of such circuitry elements, and the memory 1212, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and the given system may include additional or alternative processing platforms, as well as numerous distinct processing platforms in any combination, with each such platform comprising one or more computers, storage devices or other processing devices.

Figure 12:
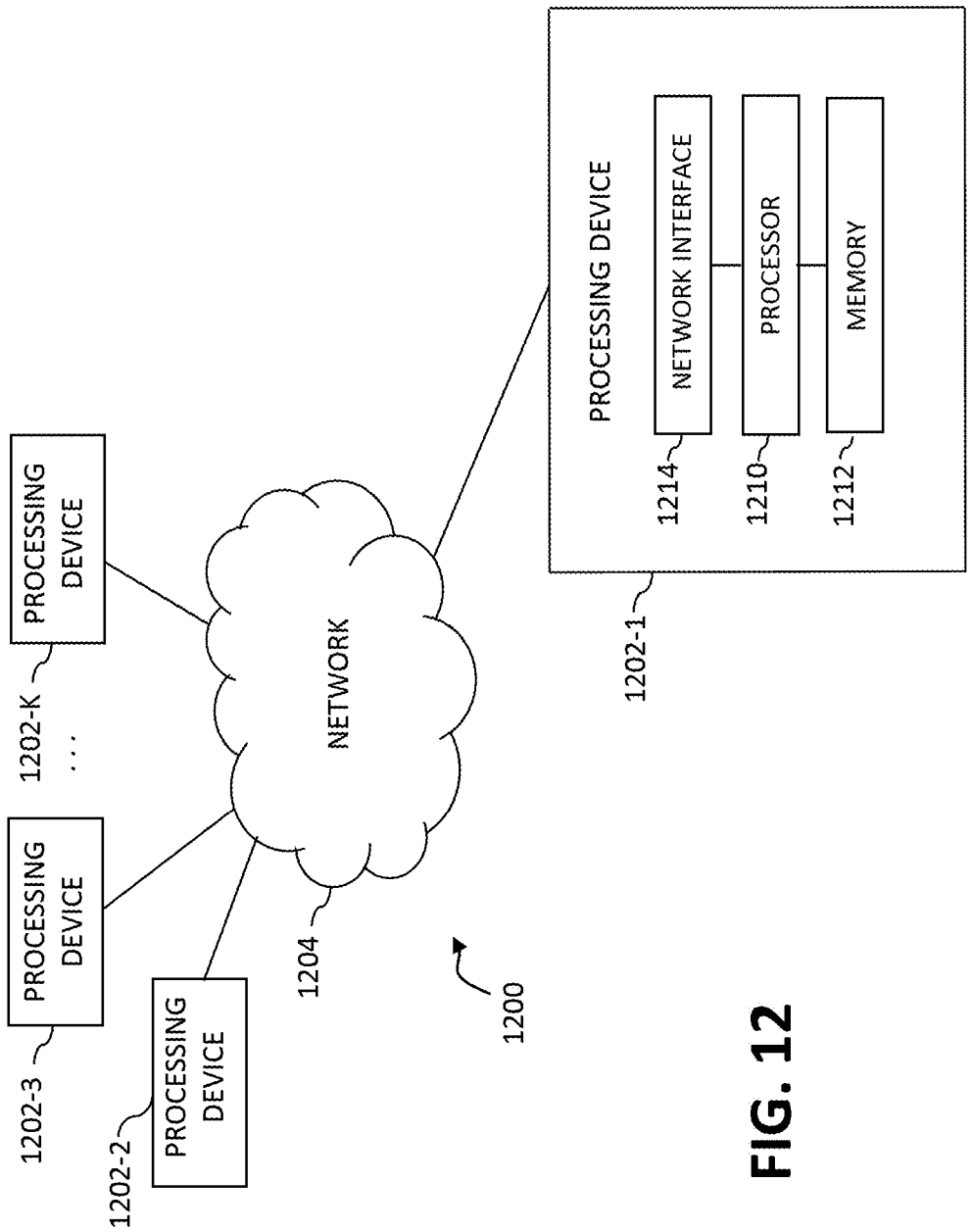
FIG. 12 illustrates another exemplary processing platform that may be used to implement at least a portion of one or more embodiments of the disclosure.

Multiple elements of an information processing system may be collectively implemented on a common processing platform of the type shown in FIG. 11 or 12, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising the steps of:
    obtaining a first cache placement plan for a dataflow comprised of a plurality of operations, wherein said first cache placement plan comprises a combination of output datasets of a subset of said operations in said dataflow to cache using one or more caching operations inserted into the dataflow to implement the first cache placement plan based on an estimated reduction in a total execution cost for the dataflow when said first cache placement plan is implemented given an input dataset;
    executing one or more operations of said dataflow and updating a count of references to said one or more executed operations to reflect remaining executions of said one or more executed operations in the dataflow;
    determining, using at least one processing device, a current cache gain by updating the estimated reduction in the total execution cost for the dataflow of said first cache placement plan based on the updated count of references to said one or more executed operations;
    determining, using the at least one processing device, an alternative cache placement plan for the dataflow following said execution based on the determined current cache gain and the updated count of references to said one or more executed operations, wherein said alternative cache placement plan comprises a combination of output datasets of a different subset of said operations in said dataflow to cache using one or more additional caching operations inserted into the dataflow to implement the alternative cache placement plan than said first cache placement plan; and
    implementing, using the at least one processing device, said alternative cache placement plan when a difference between said current cache gain for said first cache placement plan and an estimated reduction in the total execution cost for the dataflow when said alternative cache placement plan is implemented satisfies one or more predefined threshold criteria.

2. The method of claim 1, further comprising the step of updating a cost model for said one or more executed operations based on a difference between prior estimates of an execution time of the one or more executed operations obtained from the cost model and an actual execution time of the one or more executed operations.

3. The method of claim 2, wherein said determining of the current cache gain is further based on the cost model.

4. The method of claim 1, further comprising the step of removing one or more of said cached datasets from memory based on the number of references to the operations that generated said cached datasets following said updating of the number of references.

5. The method of claim 1, wherein said executing said one or more operations of said dataflow further comprises the step of updating a representation of an available computational infrastructure considering variations to the environment.

6. The method of claim 1, wherein said executing said one or more operations of said dataflow further comprises the step of updating a representation of the input dataset following said executing.

7. The method of claim 1, wherein said plurality of operations comprises a plurality of lazy-evaluated data transformations and a plurality of data actions that enact the lazy-evaluated data transformations.

8. A computer program product, comprising a non-transitory processor-readable storage medium having encoded therein executable code of one or more software programs, wherein the one or more software programs when executed by at least one processing device cause the at least one processing device to perform the following steps:
    obtaining a first cache placement plan for a dataflow comprised of a plurality of operations, wherein said first cache placement plan comprises a combination of output datasets of a subset of said operations in said dataflow to cache using one or more caching operations inserted into the dataflow to implement the first cache placement plan based on an estimated reduction in a total execution cost for the dataflow when said first cache placement plan is implemented given an input dataset;

executing one or more operations of said dataflow and updating a count of references to said one or more executed operations to reflect remaining executions of said one or more executed operations in the dataflow;

determining, using at least one processing device, a current cache gain by updating the estimated reduction in the total execution cost for the dataflow of said first cache placement plan based on the updated count of references to said one or more executed operations;

determining, using the at least one processing device, an alternative cache placement plan for the dataflow following said execution based on the determined current cache gain and the updated count of references to said one or more executed operations, wherein said alternative cache placement plan comprises a combination of output datasets of a different subset of said operations in said dataflow to cache using one or more additional caching operations inserted into the dataflow to implement the alternative cache placement plan than said first cache placement plan; and implementing, using the at least one processing device, said alternative cache placement plan when a difference between said current cache gain for said first cache placement plan and an estimated reduction in the total execution cost for the dataflow when said alternative cache placement plan is implemented satisfies one or more predefined threshold criteria.

9. The computer program product of claim 8, further comprising the step of updating a cost model for said one or more executed operations based on a difference between prior estimates of an execution time of the one or more executed operations obtained from the cost model and an actual execution time of the one or more executed operations.

10. The computer program product of claim 8, further comprising the step of removing one or more of said cached datasets from memory based on the number of references to the operations that generated said cached datasets following said updating of the number of references.

11. The computer program product of claim 8, wherein said executing said one or more operations of said dataflow further comprises the step of updating a representation of an available computational infrastructure considering variations to the environment.

12. The computer program product of claim 8, wherein said executing said one or more operations of said dataflow further comprises the step of updating a representation of the input dataset following said executing.

13. The computer program product of claim 8, wherein said plurality of operations comprises a plurality of lazy-evaluated data transformations and a plurality of data actions that enact the lazy-evaluated data transformations.

14. An apparatus, comprising:
a memory; and
at least one processing device, coupled to the memory, operative to implement the following steps:
obtaining a first cache placement plan for a dataflow comprised of a plurality of operations, wherein said first cache placement plan comprises a combination of output datasets of a subset of said operations in said dataflow to cache using one or more caching operations inserted into the dataflow to implement the first cache placement plan based on an estimated reduction in a total execution cost for the dataflow when said first cache placement plan is implemented given an input dataset;

executing one or more operations of said dataflow and updating a count of references to said one or more executed operations to reflect remaining executions of said one or more executed operations in the dataflow;

determining, using at least one processing device, a current cache gain by updating the estimated reduction in the total execution cost for the dataflow of said first cache placement plan based on the updated count of references to said one or more executed operations;

determining, using the at least one processing device, an alternative cache placement plan for the dataflow following said execution based on the determined current cache gain and the updated count of references to said one or more executed operations, wherein said alternative cache placement plan comprises a combination of output datasets of a different subset of said operations in said dataflow to cache using one or more additional caching operations inserted into the dataflow to implement the alternative cache placement plan than said first cache placement plan; and implementing, using the at least one processing device, said alternative cache placement plan when a difference between said current cache gain for said first cache placement plan and an estimated reduction in the total execution cost for the dataflow when said alternative cache placement plan is implemented satisfies one or more predefined threshold criteria.

15. The apparatus of claim 14, further comprising the step of updating a cost model for said one or more executed operations based on a difference between prior estimates of an execution time of the one or more executed operations obtained from the cost model and an actual execution time of the one or more executed operations.

16. The apparatus of claim 15, wherein said determining of the current cache gain is further based on the cost model.

17. The apparatus of claim 14, further comprising the step of removing one or more of said cached datasets from memory based on the number of references to the operations that generated said cached datasets following said updating of the number of references.

18. The apparatus of claim 14, wherein said executing said one or more operations of said dataflow further comprises the step of updating a representation of an available computational infrastructure considering variations to the environment.

19. The apparatus of claim 14, wherein said executing said one or more operations of said dataflow further comprises the step of updating a representation of the input dataset following said executing.

20. The apparatus of claim 14, wherein said plurality of operations comprises a plurality of lazy-evaluated data transformations and a plurality of data actions that enact the lazy-evaluated data transformations.

* * * * *